United States Patent Office 3,558,642
Patented Jan. 26, 1971

3,558,642
CERTAIN LOWER-ALKYL AMINO METHYL HALO PYRIDINE METHANOLS AND DERIVATIVES THEREOF
David Hartley, Lawrence H. C. Lunts, and Paul Toon, London, England, assignors to Allen & Hanburys Limited, London, England
No Drawing. Filed Dec. 10, 1968, Ser. No. 782,753
Claims priority, application Great Britain, Dec. 21, 1967, 58,013/67
Int. Cl. C07d 31/34
U.S. Cl. 260—295
5 Claims

ABSTRACT OF THE DISCLOSURE

A novel class of therapeutically useful 1-(pyridyl)-2-aminoethanols and methods for their preparation have been found.

The derivatives are of the Formula I

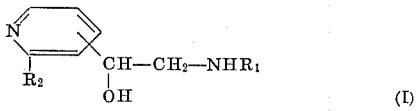

and include the aromatic N-oxides and physiologically acceptable acid addition salts thereof, in the formula $R_2$ is a halogen atom and $R_1$ is an alkyl group containing from 1 to 6 carbon atoms.

---

This invention relates to novel pyridine derivatives having biological activity, and to compositions containing the same.

The present invention provides 1-(pyridyl)-2-aminoethanol derivatives of the general Formula I and the aromatic N-oxides thereof and physiologically acceptable acid addition salts thereof:

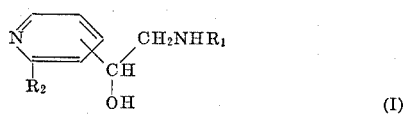

in which $R_1$ is a straight or branched chain alkyl radical containing from one to six atoms and $R_2$ is a halogen atom preferably a chlorine atom.

The compounds of Formula I all possess at least one asymmetric carbon atom, and the invention therefore includes all optically active forms and racemic mixtures of these compounds.

The compounds of the present invention have been found to have a potent blocking action of long duration on β-adrenergic receptors, and are therefore of use in the treatment or prophylaxis of angina pectoris and arrhythmias. Some also have β-stimulant properties, and may be of use as bronchodilators and spasmolytics.

These compounds may be formulated for use in human or veterinary medicine for therapeutic purposes.

The invention therefore includes within its scope pharmaceutical compositions containing as active ingredients 1-(pyridyl)-2-aminoethanol derivatives of the general Formula I and the aromatic N-oxides thereof and physiologically acceptable addition salts thereof, for example, hydrochlorides, maleates and acetates. Such compounds may be presented for use in a conventional manner with the aid of carriers or excipients and formulatory agents as required, and with or without supplementary medicinal agents.

The compositions may include, for instance, solid and liquid preparations for oral use, suppositories and injections and may conveniently be presented in dosage unit form. Oral administration is most convenient in the form of tablets which may be prepared according to conventional methods, and may be coated if required. Injections may be formulated with the aid of physiologically acceptable carriers and agents as solutions, suspensions, or as dry products for reconstitution before use. The dose of the active substance will vary within a fairly broad range. Suitable doses are those within the range of 50 mg. to 500 mg.

Suitable dosage units are those containing from 50 to 500 mg. of active ingredient per dosage unit thus providing a part or the whole of the daily dosage.

The present invention also provides a process for the preparation of the compounds of general Formula I which comprises reducing a ketone of the general Formula II

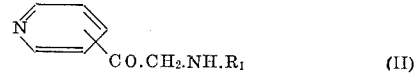

by conventional methods, for example, by catalytic hydrogenation or by the action of sodium borohydride. The ketone II may be prepared by the condensation of an amine of the general formula $NH_2R_1$ with a halogenoketone of the general Formula III

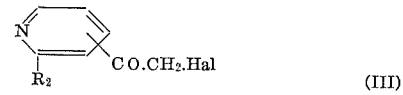

where Hal is a halogen atom.

The halogeno-ketone of the general Formula III may be prepared by reacting a pyridine nitrile derivative of the Formula IV

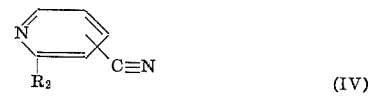

with a methyl magnesium halide, followed by halogenaation.

The halogeno-ketone of the general Formula III may also be prepared from a pyridine carboxylic acid derivative of the general Formula V

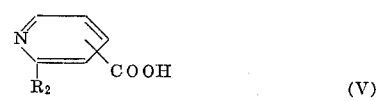

by forming the acid halide, then reacting this first with diazomethane to form the diazoketone, then with a hydrogen halide to form the halo ketone.

According to the invention the 1-(pyridyl)-2-aminoethanol derivatives of the general Formula I may also be prepared by the condensation of an amine of the general formula $NH_2R_1$ with a halohydrin of the general Formula VI

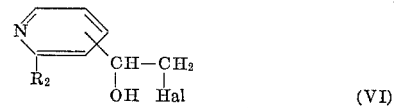

In a further process of the invention for the preparation of the compounds of the general Formula I, an amine of the general formula $NH_2R_1$ may be reacted with an epoxide of the general Formula VII

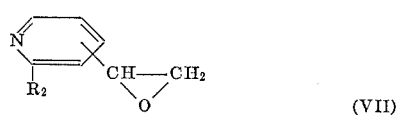

In the Formulae II to VII, $R_1$ and $R_2$, have the meanings given above.

3

In the reactions outlined above for the preparation of the compounds of the general Formula I, the pyridine-N-oxide derivative may be used in place of the pyridine derivative, or the N-oxide function may be introduced by oxidation of the O,N-diacetate of I by a peracid, followed by removal of the acetyl groups by hydrolysis.

The following examples illustrate the invention.

EXAMPLE 1

Preparation of 6-chloro-α-(isopropylaminomethyl)-3-pyridine-methanol hydrogen maleate (a) Bromomethyl - 6 - chloro - 3 - pyridyl ketone.— 6-chloronicotinic acid (5 g.) and thionyl chloride (10 ml.) were refluxed for three hours. The thionyl chloride was removed by distillation under reduced pressure, followed by two azeotropic distillations with benzene. The crude acid chloride in benzene (20 ml.), was added dropwise to a solution of 3 molar equivalents of diazomethane in ether (150 ml.) whilst maintaining the solution below 10° C. When evolution of nitrogen was complete, the diazoketone and excess diazomethane were decomposed by the dropwise addition of 48% aqueous hydrobromic acid (12 ml.). After being stirred overnight, the ether was separated, washed with sodium bicarbonate followed by water, dried over MgSO$_4$ and evaporated to dryness to yield the bromoketone M.P. 74–76° C. This was recrystallised from benzene/light petroleum (B.P. 40–60° C.) to give cream crystals M.P. 78.5–79.5° C.

(b) 6 - chloro-α-(isopropylaminomethyl) - 3 - pyridine-methanol hydrogen maleate.—Sodium borohydride (1.5 g.) was added to bromomethyl 6-chloro - 3 - pyridyl ketone (1.7 g.) in (75 ml.) whilst cooling to below 10° C. After standing for 1 hour, reduction was shown to be complete by the disappearance of the band at 244 mμ in the U.V. spectrum.

The solution was evaporated to small volume at 30° C. under reduced pressure and was poured onto ice and 2 N hydrochloric acid (100 ml.). The bromohydrin was extracted into ether, the ether was dried and evaporated to give an oil (6.5 g.) which showed no carbonyl absorption in the infra-red.

The oil in ethanol (250 ml.) was treated with isopropylamine (15 ml.) under reflux for six hours. The solution was evaporated to dryness, basified with aqueous sodium hydroxide and extracted into ether. Evaporation of the dried solution gave the base as an oily solid which was recrystallised from ethyl acetate/light petroleum (B.P. 60–80° C.) to give the basic alcohol (3.4 g.) M.P. 95–97° C.

An ethanol solution of the base was treated with ethereal maleic acid to precipitate the maleate as a white oil which became solid on trituration.

Recrystallisation from acetone gave the hydrogen maleate, as white needles, M.P. 136.5–137.5° C.

EXAMPLE 2

Preparation of 2-chloro-α-(isopropylaminomethyl)-4-pyridine-methanol hydrochloride (a) 2-chloro - 4 - pyridyl methyl-ketone.—A solution of 2 - chloro-isonicotinonitrile (20 g.) is 250 ml. of dry ether was added dropwise with cooling and stirring to a Grignard solution prepared from magnesium (8.0 g.), methyl iodide (24.8 ml.) and dry ether (250 ml.) under nitrogen. The reaction mixture was stirred at room temperature for 20 hours, after which the brown precipitate was filtered off and added slowly to ice and dilute hydrochloric acid. The clear solution was ether extracted (4× 100 ml.) and the ether was dried over MgSO$_4$ and evaporated to dryness under reduced pressure, to yield 2-chloro - 4 - pyridyl methyl ketone (16.5 g.) as pale yellow needles, M.P. 30–39° C.

Crystallisation from light petroleum, B.P. 40–60° C. gave pale yellow needles (13.5 g.) M.P. 36–39° C.

(b) Bromomethyl - 2 - chloro - 4 - pyridyl ketone.— Bromine (1.75 ml.) in chloroform (25 ml.) was added dropwise to a stirred solution of 2-chloro-4-pyridylmethyl ketone (5.0 g.) in chloroform (25 ml.). A yellow solid precipitated but complete decolourisation did not occur until hydrobromic acid (1 ml.) in glacial acetic acid was added. The mixture was stirred at room temperature for 3 hours and the solid was filtered and basified with sodium bicarbonate solution. The resulting oil was extracted into chloroform (4× 50 ml.) and the chloroform solution was dried over MgSO$_4$ and was evaporated to give the bromoketone (6.9 g.) as a pale yellow solid, M.P. 52–55° C.

When pyridine bromide perbromide was used as a brominating agent, the bromoketone was obtained as colourless needles, M.P. 56–57° C.

(c) α-(bromomethyl)-2-chloro-4-pyridine-methanol.— Sodium borohydride (0.60 g.) was added slowly to a cooled solution of the bromoketone (2.9 g.) in methanol (10 ml.). The clear solution was allowed to stand for 1.75 hours, then poured on to a mixture of dilute hydrochloric acid (15 ml.) and ice. The oily solid formed was extracted into ether (3× 50 ml.), the ether solution was dried over MgSO$_4$ and evaporated to dryness to give an opaque oil (2.65 g.).

(d) 2-chloro-α-(isopropylaminomethyl) - 4 - pyridine-methanol hydrochloride.—Isopropylamine (5.0 ml.) was added to a solution of the crude bromohydrin (2.65 g.) in ethanol (50 ml.) and the clear solution was refluxed for 16 hours. The solvent was removed and the residue treated with dilute sodium hydroxide solution and extracted with ether (4× 50 ml.). The ether was dried over MgSO$_4$, and was evaporated to give a pale yellow solid. Crystallisation from ethyl acetate gave the base (1.4 g.) as colourless needles, M.P. 110–112° C.

A solution of the base in 2.5 N hydrochloric acid was evaporated to dryness and the white solid obtained was crystallised twice from methanol-acetone to give the hydrochloride as colourless needles, M.P. 156–158° C.

EXAMPLE 3

Preparation of 6-chloro-α-(isopropylaminomethyl)-3-pyridine-methanol-1-oxide hydrochloride (a) 6-chloro-α-(N-isopropylacetamidomethyl)-3-pyridino-methanol acetate.—6-chloro-α-(N-isopropylaminomethyl)-3-pyridine-methanol (2.1 g.) was refluxed in acetic acid (15 ml.) and acetic anhydride (15 ml.) for 5 hours. The solution was evaporated to dryness under reduced pressure and the residue dissolved in cold water. The clear aqueous solution of pH=4 was extracted with ether (3× 50 ml.) and the ether was dried over MgSO$_4$ and evaporated to give about 2.3 g. of an opaque oil whose infra-red spectrum showed amide carbonyl absorption at 1650 cm.$^{-1}$ and ester carbonyl absorption at 1740 cm.$^{-1}$.

(b) 6-chloro-α-(N-isopropylacetamidomethyl)-3-pyridine-methanol-1-oxide acetate.—The amide ester (2.3 g.) in chloroform (50 ml.) was treated with m-chloro peroxybenzoic acid (1.8 g.) and the resulting solution was refluxed for 20 hours. The clear solution was extracted with sodium bicarbonate solution (4× 50 ml.) and after being dried over MgSO$_4$ was evaporated to dryness to yield a grey oil (2.3 g.).

(c) 6-chloro-α-(isopropylaminomethyl) - 3 - pyridine-methanol-1-oxide hydrochloride.—The crude amide ester-1-oxide (2.3 g.) was refluxed in 50% hydrochloric acid (25 ml.) for 1 hour. The solution was evaporated in vacuo and was dissolved in water and evaporated in vacuo again. The residue was crystallised from methanol-ethyl acetate with charcoaling to give colourless microcrystals (0.75 g.) M.P. 212–217° C. Recrystallisation from methanol gave the amine-1-oxide as colourless microcrystals, M.P. 204–207° C.

What is claimed is:

1. A compound selected from the group consisting of compounds having the following formula, the N-oxides thereof and physiologically acceptable acid addition salts thereof:

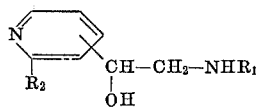

wherein $R_2$ is a halogen atom and $R_1$ is a hydrocarbon radical containing 1 to 6 carbon atoms and is selected from the group consisting of straight and branched chain alkyl groups.

2. The compounds of claim 1 wherein said atom $R_2$ is a chlorine atom.

3. 6-chloro-α-(isopropylaminomethyl) - 3 - pyridine methanol and its hydrogen maleate.

4. 2-chloro-α-(isopropylaminomethyl) - 4 - pyridine-methanol and its hydrochloride.

5. 6-chloro-α-(isopropylaminomethyl) - 3 - pyridine-methanol-1-oxide and its hydrochloride.

References Cited

UNITED STATES PATENTS

| | | | |
|---|---|---|---|
| 2,792,403 | 5/1957 | Blicke | 260—296 |
| 3,252,860 | 5/1966 | Mull et al. | 260—296 |

ALAN L. ROTMAN, Primary Examiner

U.S. Cl. X.R.

260—296; 424—263, 266